(12) United States Patent
Harris

(10) Patent No.: US 7,870,388 B2
(45) Date of Patent: Jan. 11, 2011

(54) PAGE ENCRYPTION SYSTEM

(75) Inventor: Scott C. Harris, Rancho Santa Fe, CA (US)

(73) Assignee: Illinois Computer Research, LLC, Chicago, IL (US)

( * ) Notice: Subject to any disclaimer, the term of this patent is extended or adjusted under 35 U.S.C. 154(b) by 0 days.

(21) Appl. No.: 12/389,365

(22) Filed: Feb. 19, 2009

(65) Prior Publication Data

US 2009/0228706 A1    Sep. 10, 2009

Related U.S. Application Data

(60) Division of application No. 11/677,739, filed on Feb. 22, 2007, now Pat. No. 7,512,793, which is a continuation of application No. 09/557,278, filed on Apr. 24, 2000, now Pat. No. 7,194,624.

(51) Int. Cl.
*H04L 29/06* (2006.01)

(52) U.S. Cl. .................................................. 713/167
(58) Field of Classification Search ............... 713/167
See application file for complete search history.

(56) References Cited

U.S. PATENT DOCUMENTS

| 5,321,749 A | 6/1994 | Virga |
| 5,819,289 A | 10/1998 | Sanford, II et al. |
| 6,018,710 A | 1/2000 | Wynblatt et al. |

OTHER PUBLICATIONS

The American Heritage College Dictionary, 2002, Houghton Mifflin Company, Fourth Edition, pp. 295 and 545.
Tool to Aid Translation of Web Pages Into National Languages, Jan 1998.

*Primary Examiner*—Jacob Lipman
(74) *Attorney, Agent, or Firm*—Law Office of Scott C. Harris, Inc.

(57) ABSTRACT

Text containing files are encrypted by first formatting the files for display. The display-formatted files are then run length coded to form files indicating the information. The files are encrypted.

10 Claims, 3 Drawing Sheets

PAGE ENCRYPTION SYSTEM

This is a divisional of U.S. application Ser. No. 11/677,739 filed Feb. 22, 2007, now U.S. Pat. No. 7,512,793, which is a continuation of U.S. application Ser. No. 09/557,278, filed Apr. 24, 2000 now U.S. Pat. No. 7,194,624, issued Mar. 20, 2007.

BACKGROUND

The present application relates to encryption of formatted pages. More specifically, this relates to encryption of a page to be transmitted over a channel, e.g., a network such as the Internet.

Encryption includes the study of trying to increase the security of a system. Attacks on encryption attempt to defeat that security. A sufficiently complicated cryptosystem will make it effectively impossible to decode plaintext from only ciphertext. If sufficiently difficult, only a brute force method, i.e., a test of each of the possible keys, could recover the plaintext.

However, very complicated cryptosystems are often used for carrying out the encryption and decryption. For example, many of these complicated crypto systems use various techniques including multiple arithmetic operations, and attempts to smooth the frequency distribution of the resulting ciphertext.

The frequency distribution of the ciphertext can be used as a way to attempt to recover the plaintext. Many early cipher systems, in fact, were defeated using the principle of frequency analysis.

The trend in the art has been to make a more complicated cryptosystem based on more complicated mathematics. This in turn, however, requires higher processing requirements, and higher data handling capabilities. Many of these systems require a large portion of the message to be received before the entire decryption is carried out. Encryption on a thin client such as a handheld computer; personal digital assistant ("PDA"); or portable telephone can require a significant portion of the resources.

SUMMARY

The present application teaches encryption by first formatting text for display, and then encrypting that text. This system can be more secure than other cipher system, for a given level of complexity. The usual kinds of frequency-based attack methods are less applicable to this new system. Moreover, the present system is extremely useful for use over a transmission channel, e.g. a network such as the internet or a wireless channel.

The present application teaches a technique of coding a text or text-containing file by converting the text to an image viewable form indicative of the text. The viewable version of the text is encoded using a block based or pixel based coding scheme. Those coded values are encrypted.

At the receiving end, the encrypted values are decoded to retrieve the formatted text.

The system encrypts and returns images of whole formatted text, rather than the ASCII text itself that is returned by many cryptosystems.

In this way, text is recovered but in a way that reduces the possibility of cryptanalysis by using frequency techniques.

One embodiment of this system adds an additional layer of security using steganographic techniques to encode information within the text itself.

Yet another embodiment of this system is optimized for use in a thin computer such as a PDA or cellular telephone. Each unit portion of the image can be handled as a single block, and decoded as one block. This reduces the amount of memory that needs to be used for the decryption.

In one embodiment, the decryption simply corresponds to a series of numbers or characters. The numbers indicate the kind of image which is displayed on the page. This series of numbers cannot by itself be read or perceived without other information. Brute force analysis methods can become more difficult. Since there is no standard by which a brute force analysis can be judged as right or wrong, it becomes more difficult to effect such an analysis.

Another aspect describes specific coding schemes which can be used, including run length coding, and specific forms of run length coding.

A BRIEF DESCRIPTION OF THE DRAWINGS

These and other aspects will now be described in detail with reference to the accompanying drawings, wherein.

DETAILED DESCRIPTION

Figure 1:
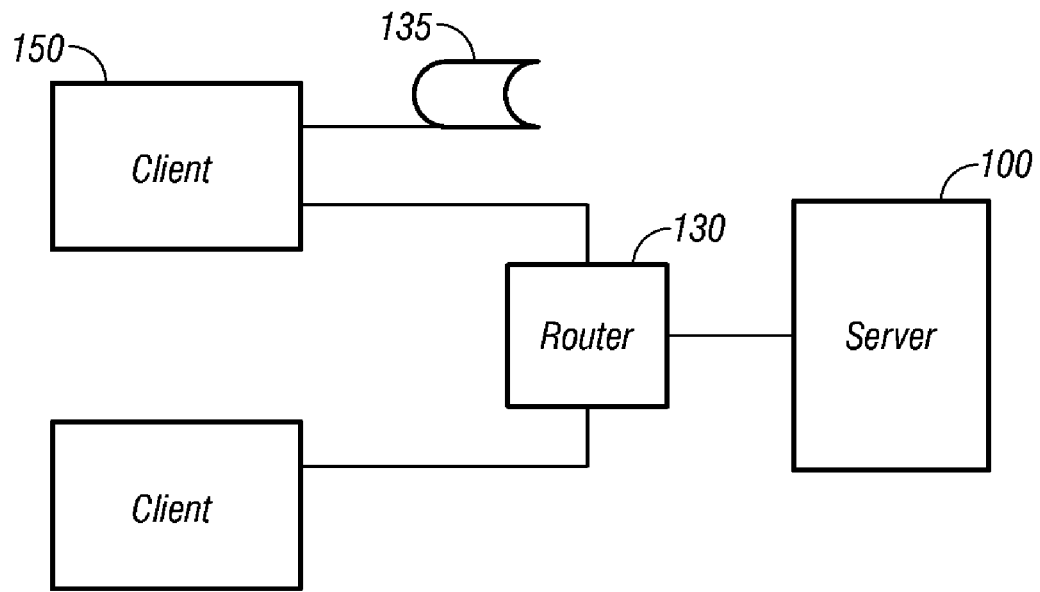
FIG. 1 shows as basic block diagram of the system.

FIG. 1 shows a system operating between a server 100 and a client 150, e.g. a thin client. The server 100 includes a message 102 which is to be sent to the client 150. This message is text-containing information. The text containing information can include plain text (a "txt" type file), a word processing file which can include font and/or control information, an HTML file, or other information that can be formatted into a perceivable form. The information is sent over a channel 140. Channel 140 may be a wired channel, or a wireless channel such as a part 15 frequency e.g., 48 MHZ, 900 MHZ, 2.4 GHZ, or by BLUE TOOTH™, or an infrared channel. The plaintext message can be from any source, e.g., from an e-mail request. It can also be a web page, e.g., in hypertext mark up language ("HTML").

An embodiment is disclosed herein which uses this encryption system in a thin client environment, such as a hand held computer element e.g., a PDA such as the PALM™ series of handheld computers, some other handheld computer, or a portable telephone. Less power and memory may be available in this environment. However, it should be understood that the disclosed system is usable in any computing environment.

This system has a number of advantages. Since the system operates on shapes, it can be less susceptible to decryption by frequency analysis that is based on the character of alphabets. Also, since this system encodes shapes, no CRC or other kind of error check needs to be used. Errors will simply show up as noise in the resulting "plaintext". Such letters will not make the plaintext unreadable, as it could in systems that return text values. This can be an advantage, since the error check part of an encryption sequence can itself be used as a means of detecting whether any particular key is the correct key. In turn, such systems are often used in brute force analysis techniques.

The basic hardware forming the basic setup of the present invention is shown in FIG. 1. A server computer 100, at a central location, stores a database of information, as well as a user interface program, and a main program which can run a network interfacing program, such as a web browser. The server computer 100 is connected to a channel 110, which connects the server 100 to a plurality of client computers 150, 155. The network can be the Internet, or can be any other network that allows an exchange of information. For example, in one embodiment, the network 110 may be a dedicated dial-up or LAN network. The network comprises at least an information line, and a router 130. The information line 110 can be a telephone line and the router 130 can be the internet backbone, for example. The server computer 100 runs a routine that is described with reference to the flowchart of FIG. 2.

Many client computers can be connected to the server 100. Clients can be at a remote location. The client could also be local; e.g., when the encryption is on the local drive associated with a computer.

The client computer 150 can be any computer which is capable of receiving information over the channel 130. In addition, the client computer can have various peripherals attached thereto. These peripherals can include, for example, an image sensor 135 which can be used as a camera or a bar code reader, a fingerprint reader, or the like.

In operation, each or any of the client computers is driven to run the specified routine under control of the server 100.

Figure 2:
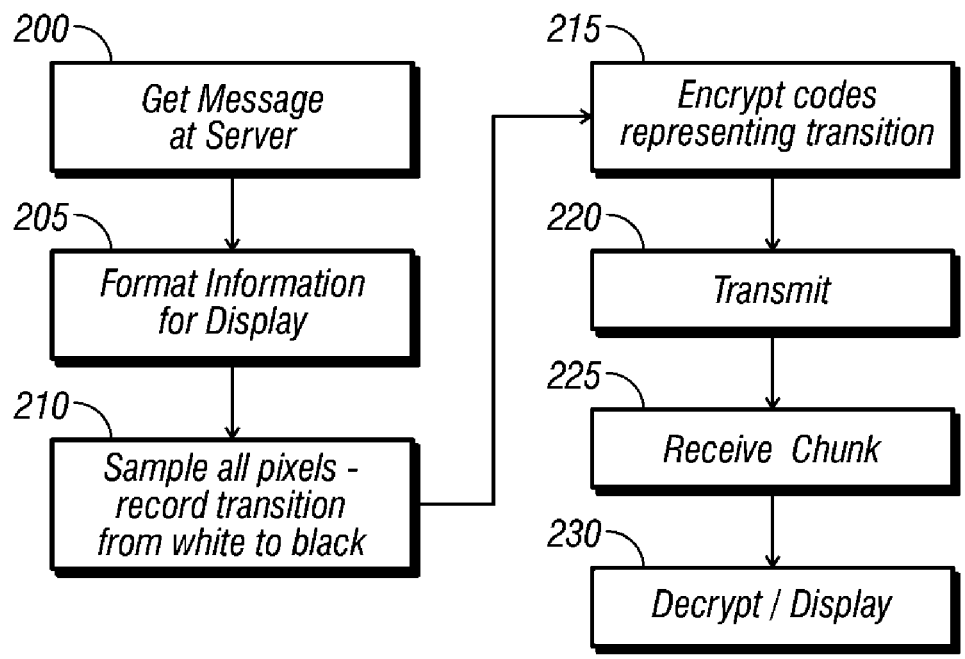
FIG. 2 shows a flowchart of operation.

The specified routines run by both the client and server computers are shown in FIG. 2. It should be understood, however, that multiple client computers could simultaneously operate. When this happens, this server part of the routine may have multiple clients requesting information from the same server. A multitasking system can be used to handle these requests.

FIG. 2 shows the operation. At 200, a message to be sent is obtained. This message is conventionally referred to as plaintext, and is converted into ciphertext according to an encryption key. The encryption key can be stored in the client computer, or entered from an external source.

This cryptosystem uses a mapping, f, from the plaintext message segment, M, to a ciphertext segment, C. A parameter E is the cryptographic enciphering □key□. Here f is the enciphering algorithm that generates C from M and E. Thus, C=f(M,E). The message is decrypted according to a mapping g using a decryption parameter. D, is the deciphering key, which may or may not be the same as the enciphering key E, and g is the deciphering algorithm that recovers the original message M from the received enciphered message C and the deciphering key D. Hence M=g(C,D). In a stream cipher, these can be □small□ functions. The message is divided into segments, $M_k$, and a stream of key, $E_k$, is generated.

The sender computes the stream $C_k$=f($M_k$, $E_k$).

The recipient generates or stores the stream $D_k$ and decodes $M_k$=g($C_k$, $D_k$).

The cryptological technique can be made public or can be private. The security against unauthorized reception is in the key stream, $E_k$. The mutual information between $M_k$ and $E_k$ should be sufficiently small that the message cannot be determined by statistical methods. Alternately, the space from which $E_k$ is selected can be too large to be searched.

For a public key system, the objects are from very large sets, e.g., 128 bits which is $2^{128}$ 3.4×$10^{38}$ items.

The public knows the function f. The encryption key, E, is distributed. A message sender computes and transmits C=f (M, E), and transmits E if it is randomly generated. In this case, the owner of the system also has g and either has D or has an algorithm to generate g from E. The owner then computes g(C, D) to recover M. The security of such a system is based on the difficulty of inverting the function f, without additional information that is known only to the owner. Any known encryption system including PGP, RSA, DES, SHA, or any others can be used. The ciphertext should be sufficiently unrelated to the plaintext such that the plaintext cannot be obtained from the ciphertext without the key, without an extreme degree of difficulty.

The encryption scheme can be any desired encryption scheme, including based on elliptical curves, DES, RSA or the like.

Figure 3A:
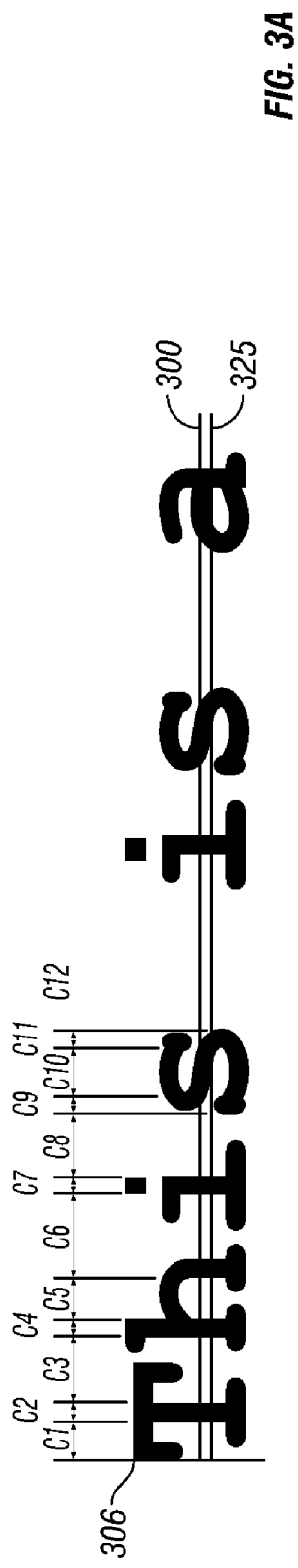
FIGS. 3A and 3B show coding text which has been formatted using different fonts.
Figure 3B:
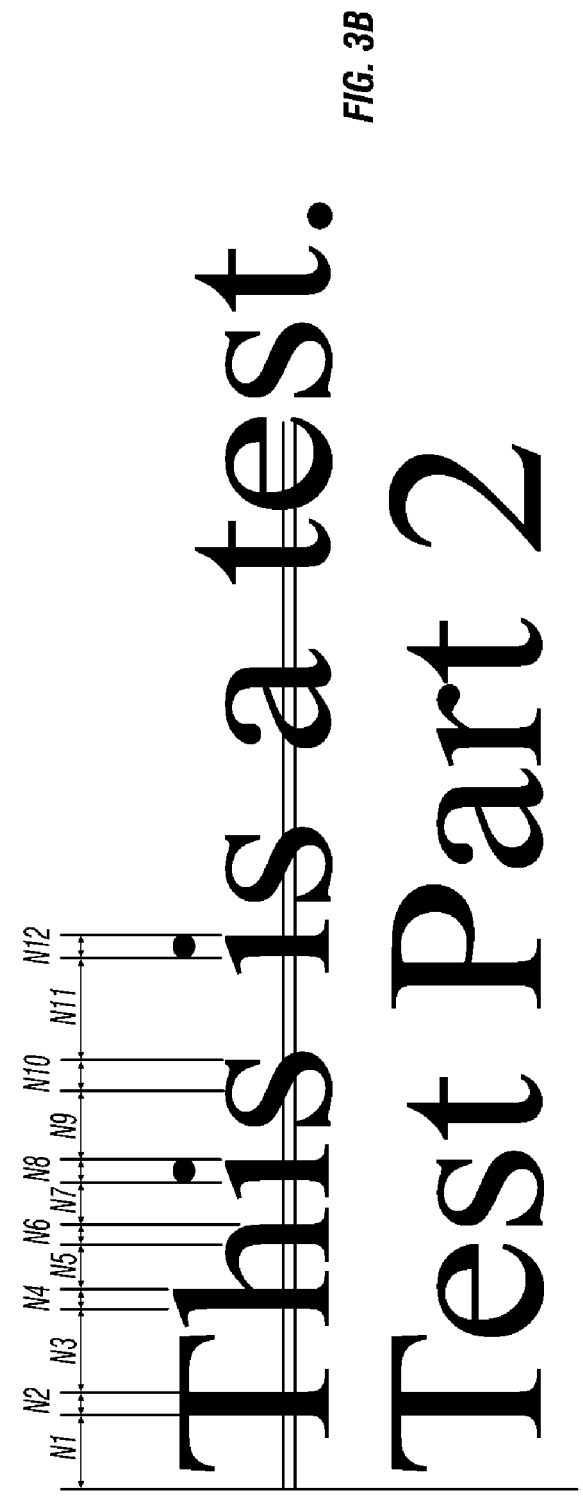

Once the message is received at the receiving end in a messaging environment, it will be displayed to the user. Display of a message involves formatting the message into a readable form, and displaying that readable form on the screen of the messaging element, e.g., a computer. The present application carries out the display formatting operation prior to encryption. In this embodiment, the plaintext is text only, but it should be understood that the plaintext may include other information as in other embodiments. The text, represented in ASCII or any other form, is formatted for display. This can use a system default font, or if font information is included with the text, the system can use that font information. For example, the text may be stored in a word processing format, such as Word or Rich Text Format ("RTF"). The text is then formatted for display. A sample of the text as formatted for display is shown in FIGS. 3A and 3B.

At 205, the computer 100 formats the information for display. This format for display includes formatting the plaintext according to its font and display information. The display is formatted according to a specified resolution, where the resolution can be one established in advance, or can be any other desired resolution. In the case of a thin client, the resolution may be relatively low.

The formatted plaintext is then coded according to its viewable characteristics. Examples of the coding are shown in FIGS. 3A and 3B. It is recognized, as many have recognized before, that displayed text is mostly formed of continuous blocks of the same type of information. Therefore, the pixels may include long blocks of white, followed by relatively long blocks of black. On the pixel scale, assuming an 800×600 resolution, it might be common to see 50 white pixels, followed by 10 black pixels and the like. The preferred coding scheme disclosed herein takes advantage of this characteristic. FIGS. 3A and 3B show this. The line 300 in FIG. 3A represents a one pixel wide sample. Of course, unless the pixels are extremely coarse, they will be much smaller in scale then that shown in FIG. 3A. All of the textual material that intersects the pixel is sampled. For example, the first part C1 is a series of white pixels. These white pixels are encoded as zeros, yielding a long string of zeros beginning the code. The distance C1 shown in FIG. 3A represents the length of the long string of zeros. The string of zeros ends at the beginning of the "T", where the black part beginning the letter "T", begins. The width of the T, here area C2, is then encoded as "1"s, representing black. Similarly, white "0" and black "1" areas alternate across the entire line 300. FIG. 3A shows obtaining the values C1 through C12 to represent the sample along the word "This". Similar operations are carried out for pixels T−1 through 0 and for pixels T+1 through T max resolution. This is shown in FIG. 2 which requires sampling all pixels and recording the transition from white to black.

When this operation is complete, the entire image has been reduced to a series of numbers representing the transition points of the formatted plaintext at the specified resolution and display characteristics. A special symbol or character may be used to represent the end of the line. Alternately, in order to avoid all lines having precisely the same length, the end of line can alternatively be established at the spot 325 which represents the last transition. In this way, each of the lines may have a different length. As an example of the way in which this system operates, consider FIG. 3A as compared with FIG. 3B. This shows that the numbers that would be transmitted for different fonts are unrelated.

At 220, the codes for a "chunk" is transmitted. The chunk can be the whole page, or only part of the page. The chunk is received by the client at 225, and decrypted and displayed at 230. The chunk may be displayed as soon as it is received; so that storage of multiple parts becomes unnecessary. Each chunk can be a line or line part.

A number of coding simplifications can be used. First, since the system always codes only transitions, only the values, e.g., numbers, representing the distance between transitions need to be sent. By convention it can be established that the initial numbers are always zeros. If the initial number is a one, such as at spot 306, then the first number sent will be a zero representing an immediate transition.

A special symbol or series may be used to represent multiple chunks being the same. For example, this can occur when one line of pixels is the same as another line of pixels.

Yet another symbol can be used to represent that an entire row of white or black pixels is sent.

The end result is a series of codes representing the run-length-coded version of the plaintext. This series of codes is then encrypted at 215.

This series of codes can be encrypted using any encryption technique. However, since this system is less susceptible to frequency analysis, a relatively lower security encryption system may be used. Less secure encryption systems may be less mathematically intensive. Therefore, this system is more useful for a thin client such as a handheld computer, cell phone or the like.

A less secure encryption system requires fewer calculations. In addition, this has the additional advantage that parts of the display formatting are actually carried out in the client encrypting computer. This allows the decrypting computer to effect fewer calculations since the display formatting has already been carried out. Effectively, the information to be displayed is already formatted for display and simply needs to be decrypted in order to be displayed.

Also, each chunk of information can be displayed as soon as it is received and decrypted. This avoids storage of large amounts of information, which can itself require resources.

A number of additional aspects can make this system more secure. While the system is less susceptible to certain kinds of decryption attacks, it may be susceptible to an attempt to "stitch" together different parts of the lines. The main embodiment disclosed above teaches variable length lines ending at the last transition. Other techniques can also avoid this stitching. An alternative embodiment encodes the image as though it were one long line. In this system, the end of the T in test is the first transition to white, and the beginning of the T in "the" in the next line is the next transition. This represents the number of white pixels, and may make stitching more difficult.

Another embodiment rearranges the lines to be transmitted in a random order. In this way, stitching becomes more difficult. The line number can be established in advance, can be transmitted as part of the message, or in a particular embodiment, can be transmitted as part of the message.

An alternative way is to have the client 150 use a random number generator to set the order of lines. This random set of numbers can be sent to the encrypting computer 100 between pages. The client 100 then sets the pages.

Alternatively, the same operation can be done in the encrypting computer 100, which can use a random number generator to set the order, encrypt that message using a first key (which can be more secure than the second key) and then send the lines in that way.

Figure 3C:
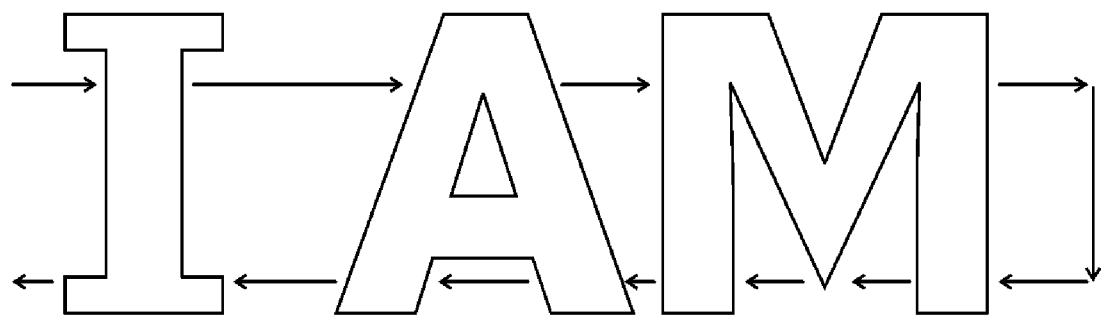
FIG. 3C shows sampling text in opposite directions.

Yet another alternative is to send the information in alternative directions, e.g., a zigzag operation as shown in FIG. 3C. The end of one line doubles back toward starting at the end of the next line, going in the reverse direction. Again, only the positions of transitions need to be encoded.

Other alternatives allow using more complicated procedures. The above has discussed use for straight text. This system also has use with gray scale operations. In that case, a different system, other than the run length coding, may be used. Alternatively, a system of run length codes which encode more than just transitions might be used. The system can also be used to store text which includes images therein.

For example, many messages are in html format. These messages may include images or other information as part of the text, and may also be in color. An embodiment for encoding such an html message is disclosed herein. It should be noted, however, that since this system is less susceptible of being displayed on a thin client, that it may be more desirable to change this to a more text oriented approach.

Figure 4:
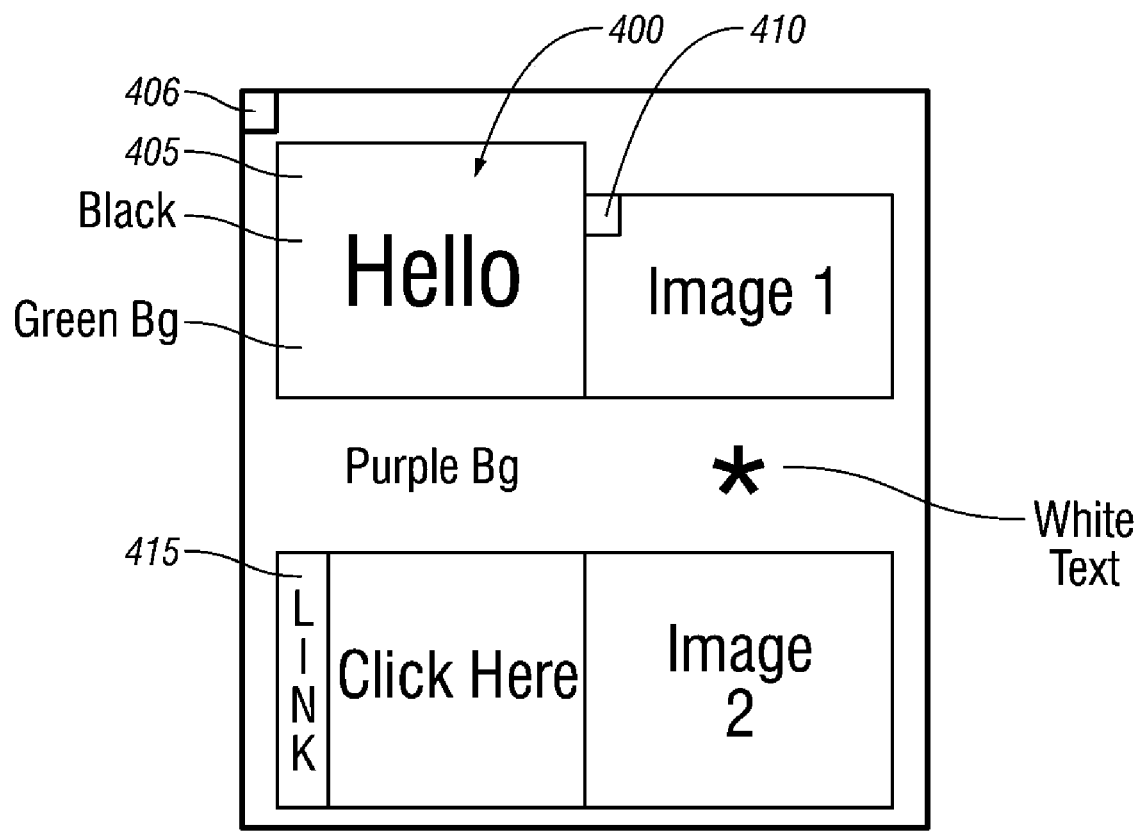
FIG. 4 shows an HTML embodiment which encodes text attributes and images.

An html embodiment is shown in FIG. 4. Many messages are sent using hypertext mark-up language. The html embodiment here simply includes special reserved codes for special functions. Html code, and other similar codes, include special reserved scripts for certain functions, such as color, hypertext, and the like. This system can handle html in an analogous way to those ways discussed above. Three basic embodiments are disclosed.

In the first embodiment shown in FIG. 4, the text 400 is encoded in a similar way to that disclosed above. In addition, special tags are added to certain parts of the text. The tags can be used, like tags in standard html format, to turn on or off a certain attribute. Area 405 is coded with a tag 406 indicating that area 405 should be black text/green background. Transitions between the black and green are encoded as before. Any font information is simply ignored since this will be encoded as part of the run length coding scheme.

Similarly, non-text objects, such as images, are marked with a location, e.g., the first location, here 410, which is encountered by the scanner. The outer size of the image is also noted, thereby shortening the lines and making the area 405 smaller. In this way, the text is sent and images are sent separately, for example, encrypted using any standard encryption technique. Hyperlinks such as 415 are also encoded with the area of the text.

A second scheme steganographically changes the transmitted text to encode the image. The remainder of the technique remains the same.

Since the text is in color, the run length coding indicates a transition from a first color to a second color, both of which are indicated. That is, the first area of white has a transition to a second area which can be any color, e.g., purple. The purple can be indicated by its red, green and blue values, or by a color attribute. In a thin client only a limited number of colors may be displayable in any case. Therefore, an indicia of this 256 color value can be provided as part of the run length code.

Hyperlinks are indicated as one of the colors. The hyperlink must be maintained as text rather than as an image so that the hyperlink can be properly used to effect a transition.

Additional security against stitching can use variable line chunks. Each line chunk can represent operations in different directions. For example, some of the line chunks may represent left to right, others right to left. Each line chunk can represent a different number of items. Each chunk therefore becomes a different sample in the set. Chunks can have arbitrary sizes. In addition, the chunks can be located at arbitrary locations. By so doing, the difficulty of stitching increases as the factorial of the number of chunks. Each chunk can also be encrypted with a different encryption code, in order to further prevent stitching.

Another security enhancement is provided by the separation of the control part from the actual text part. The message screen is sent in two parts including a readable part and a control part. The information in the control part tells certain attributes about the message. For example, in an html message, the control characters may be separated from the actual message. Hence, using this embodiment, a text message may be displayed with the attributes of the text message being transmitted in the control part. The control part can be encrypted using more secure (or less secure) encryption techniques. However, the control part is encrypted using a separate encryption technique to make it more difficult to deduce the code from this control part. This control part can also be sent as both a header and a footer, with the header indicating, for example, the order of lines being transmitted, and those chunks which are repeated, and the footer indicating attributes including color, hypertext and the like.

Although only a few embodiments have been described above, other modifications are possible. For example, one modification defines interactively determining if a resolution of the display can be reduced prior to the encryption. The resolution, for example, can be divided by two, if more than a specified percentage of the lines have the same or similar run length codes.

The present application has described using this system for encryption of the information. However, this system can also be used for sending this information over a channel without encrypting it.

All such modifications are intended to be encompassed within the following claims.

What is claimed is:

1. A method, comprising:

obtaining a file that represents information to be displayed on a display wherein said file includes HTML information;

separating readable parts of the HTML information from a control part of the HTML information, where the control part instructs information and attributes about the file and instructs at least a color of at least one aspect of the HTML information;

converting only a portion of said file, representing only a chunk of the information to be displayed, into a series of codes representing the chunk, where said chunk is less than the entire information that is to be displayed at one time; and sending said series of codes to a display for display of said chunk, prior to sending codes representing portions of other parts of the file, wherein said sending comprises sending said readable parts of the HTML information in a separate part from said control part of said HTML information.

2. A method as in claim 1, wherein said portion of the file comprises a line of the information to be displayed.

3. A method as in claim 1, wherein said information to be is displayed comprises an image.

4. A method as in claim 1, further comprising sending a code that represents another chunk, which is the same as a chunk which was previously sent.

5. A method as in claim 1, wherein said converting comprises carrying out an encryption operation while converting said chunk to the series of codes.

6. A method as in claim 1, further comprising displaying said chunk of information prior to receiving other portions of information.

7. A method as in claim 1, further comprising converting and sending a second chunk of said file, where said second chunk has a different size than said first chunk.

8. A method as in claim 1, further comprising encrypting said readable parts separately from said control part.

9. A method as in claim 1, wherein said information to be displayed comprises an image representing text.

10. A method as in claim 9, wherein said coding comprises coding according to viewable characteristics of the image.

* * * * *